(12) United States Patent  
Biggs

(10) Patent No.: US 6,226,724 B1
(45) Date of Patent: May 1, 2001

(54) MEMORY CONTROLLER AND METHOD FOR GENERATING COMMANDS TO A MEMORY

(75) Inventor: Terry L. Biggs, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/929,128

(22) Filed: Sep. 3, 1997

(51) Int. Cl.[7] .................................................. G06F 12/00
(52) U.S. Cl. ........................ 711/170; 711/154; 711/158
(58) Field of Search ................................. 711/170, 105, 711/154, 5, 158; 395/200.57, 200.83, 200.54; 365/201

(56) References Cited

U.S. PATENT DOCUMENTS

| | | | |
|---|---|---|---|
| 5,713,006 | * | 1/1998 | Shigeeda .............................. 711/170 |
| 5,737,765 | * | 4/1998 | Shigeeda .............................. 711/170 |
| 5,812,472 | * | 9/1998 | Lawrence et al. ................... 365/201 |
| 5,862,338 | * | 1/1999 | Walker et al. ................... 395/200.54 |

OTHER PUBLICATIONS

Hitachi, Ltd., SH7708 Hardware Manual Hitachi, Version 2.5, pp. 246–261, Jun. 23, 1997.

* cited by examiner

*Primary Examiner*—Do Hyun Yoo
*Assistant Examiner*—Nasser Moazzami
(74) *Attorney, Agent, or Firm*—Paul J. Polansky; Robert L. King

(57) ABSTRACT

A memory controller (42) controls accesses to a command-based memory device (43) such as a synchronous DRAM. The memory controller (42) uses an address comparator (45) for both base address matching and command generation. When the memory controller (42) detects an access to the memory device (43) and a control register bit is set, a state machine (56) causes the command to be written to the memory device (43). The memory controller (42) thus allows the memory device (43) to be accessed with little additional circuitry, and to be connected to higher order address bits to speed the access. Since the commands are detected by accesses to the same memory locations as reads and writes, the memory controller (42) avoids creating "holes" in the memory map.

15 Claims, 4 Drawing Sheets

FIG. 2 –PRIOR ART–

Register 30:

| A9 | A8 | A7 | A6 | A5 | A4 | A3 | A2 | A1 | A0 |
|----|----|----|----|----|----|----|----|----|----|
| OPCODE | | 0 | LMODE | | | BT | BL | | |
| 31 | | | 32 | | | 33 | 35 | | |

34 — Burst Type

| A3 | BURST TYPE |
|----|------------|
| 0 | SEQUENTIAL |
| 1 | INTERLEAVE |

33 — CAS Latency

| A6 | A5 | A4 | CAS LATENCY |
|----|----|----|-------------|
| 0 | 0 | 0 | R |
| 0 | 0 | 1 | 1 |
| 0 | 1 | 0 | 2 |
| 0 | 1 | 1 | 3 |
| 1 | X | X | R |

35 — Burst Length

| A2 | A1 | A0 | BURST LENGTH BT=0 | BURST LENGTH BT=1 |
|----|----|----|-------------------|-------------------|
| 0 | 0 | 0 | R | R |
| 0 | 0 | 1 | 2 | 2 |
| 0 | 1 | 0 | 4 | 4 |
| 0 | 1 | 1 | 8 | 8 |
| 1 | 0 | 0 | R | R |
| 1 | 0 | 1 | R | R |
| 1 | 1 | 0 | R | R |
| 1 | 1 | 1 | FP | R |

FP = FULL PAGE
R = RESERVED (INHIBIT)

31 — Write Mode

| A9 | A8 | WRITE MODE |
|----|----|------------|
| 0 | 0 | BURST READ AND BURST WRITE |
| 0 | 1 | R |
| 1 | 0 | BURST READ AND SINGLE WRITE |
| 1 | 1 | R |

MEMORY CONTROLLER AND METHOD FOR GENERATING COMMANDS TO A MEMORY

FIELD OF THE INVENTION

This invention relates in general to memory systems, and more specifically to memory controllers.

BACKGROUND OF THE INVENTION

Memory devices have traditionally been accessed by a relatively standard set of control signals that are used by all manufacturers. For example, dynamic random access memories (DRAMs) have traditionally been accessed by a row address strobe (RAS) signal, a column address strobe (CAS) signal, a write enable (WE) signal, and a chip select (CS) signal. These signals were used to control the timing of the internal circuitry on the memory, and the memory generally performed asynchronously with respect to any other system clock signals. Recently, however, synchronous memory devices have become popular. In synchronous memory devices, the signals that previously controlled the timing of events inside the memory instead encode commands for various functions and are recognized by the memory synchronously with the system clock signal. Accesses to synchronous memory devices have required new memory controller designs.

For example, synchronous DRAMs (SDRAMs) recognize a set of commands that are encoded on the RAS, CAS, WE, and CS input signals, and typically on one or more address signals as well. SDRAM controllers recognize memory accesses to the SDRAMs and generate these signals in the appropriate sequence in response. In addition to recognizing accesses to the SDRAMs, the SDRAM controller also generates the appropriate combinations of signals to perform certain overhead functions. For example, after power up SDRAMs require all banks to be precharged. In addition SDRAMs typically have a mode register that allows the SDRAM to be configured for the particular system. Known SDRAM controllers perform these overhead functions by recognizing an access to a special memory-mapped location. However these approaches require extra address decode logic and can create "holes" in the address space that are then unavailable to other devices. In addition the circuitry for performing these overhead accesses has tended to be complex. What is needed is a controller for memories such as SDRAMs that is flexible but at the same time requires a minimum of extra circuitry to perform overhead accesses. Such a memory controller is provided by the present invention, whose features and advantages will be further described with reference to the drawings and the accompanying description.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 2 illustrates in block diagram form the mode register of the memory of FIG. 1.

DETAILED DESCRIPTION OF A PREFERRED EMBODIMENT

Figure 1:
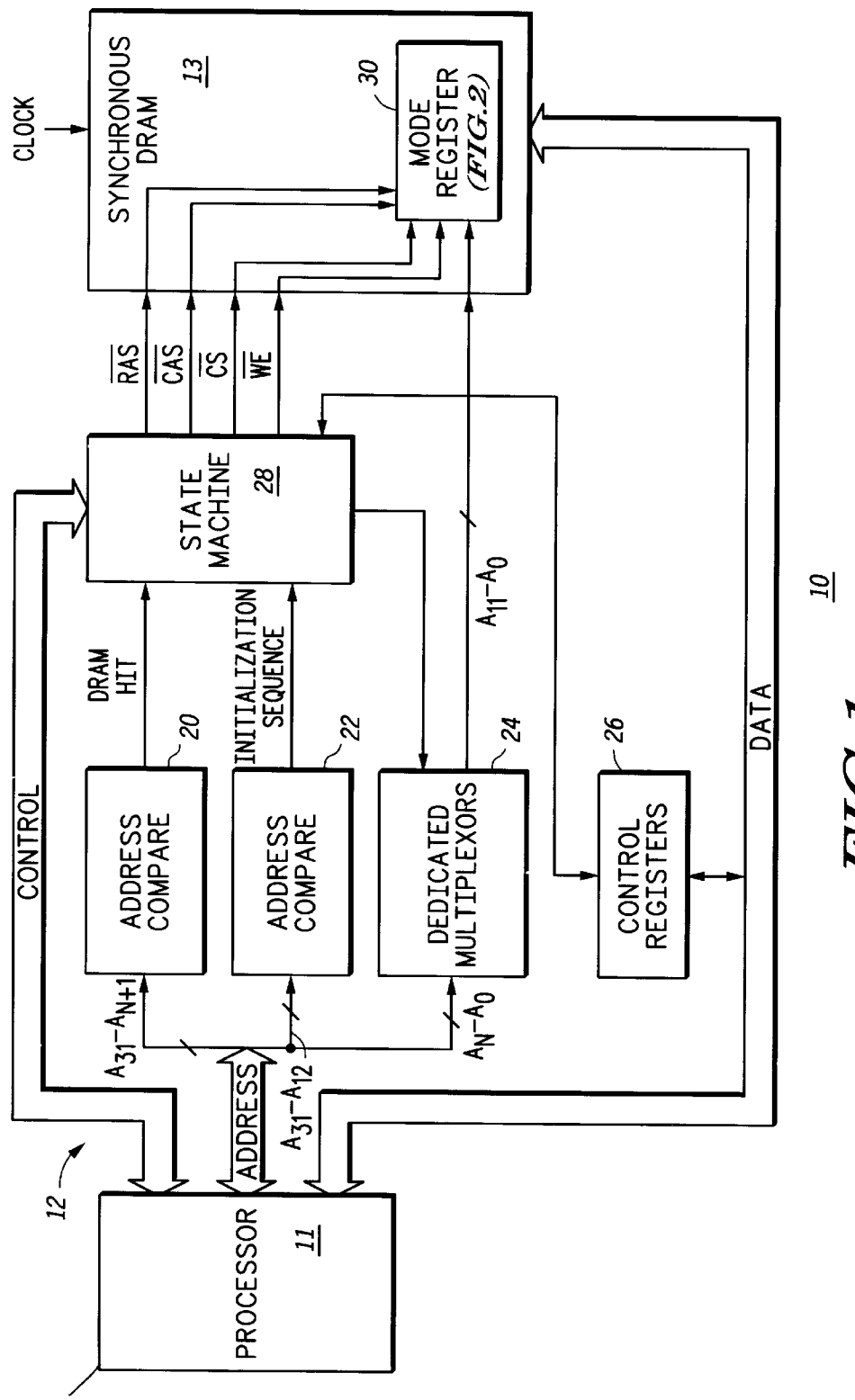
FIG. 1 illustrates in block diagram form a data processing system with a memory controller known in the prior art.

FIG. 1 illustrates in block diagram form a data processing system 10 with a memory controller 12 known in the prior art. Data processing system includes generally a processor 11, memory controller 12, and a synchronous dynamic random access memory (SDRAM) 13. Processor 11 has a bi-directional control terminal for conducting control signals labeled "CONTROL", an address output terminal labeled "ADDRESS", and a bi-directional data terminal for conducting signals labeled "DATA".

Memory controller 12 includes address compare circuits 20 and 22, a dedicated multiplexors 24, a control register 26, and a state machine 28. Address compare circuit 20 has an input terminal for receiving a portion of the ADDRESS, and an output terminal for providing a signal labeled "DRAM HIT". Processor 11 outputs a 32-bit address A31–A0, and address compare circuit 20 receives a portion of these address signals labeled "$A_{31}$–$A_{N+1}$". The value of N varies based on the organization of SDRAM 13 in a manner that will be more fully described below. Address compare circuit 22 has an input terminal for receiving address signals $A_{31}$–$A_{12}$, and an output terminal for providing a signal labeled "INITIALIZATION SEQUENCE". Dedicated multiplexors 24 have an input for receiving address signals AN–A0, a control input terminal, and an output terminal for providing address signals $A_{11}$–$A_0$. Note that the same nomenclature is used for address signals that are output by processor 11 and those which are output by memory controller 12. Control register 26 has a bidirectional control terminal, and a bi-directional terminal connected to the DATA bus. State machine 28 has a bi-directional control terminal connected to the control terminal of processor 11 for conducting the CONTROL signals, a bi-directional control terminal connected to the control terminal of control register 26, an input terminal for receiving the DRAM HIT signal, an input terminal for receiving the INITIALIZATION SEQUENCE signal, and output terminals for providing a row address strobe signal labeled "RAS", a column address signal labeled "CAS", a chip select signal labeled "CS", and a write enable signal labeled "WE".

SDRAM 13 has an input terminal for receiving a clock signal labeled "CLOCK", control input terminals for receiving the RAS, CAS, CS, and WE signals, and a bidirectional data terminal connected to the data terminal of processor 11. SDRAM 13 further includes a mode register 30 having input terminal for receiving the RAS, CAS, CS, and WE signals, and an input terminal connected to the output terminal of dedicated multiplexors 24.

In operation, processor 11 is adapted by memory controller 12 to perform memory accesses to and from SDRAM 13. Synchronous DRAM 13 performs accesses synchronously with respect to the CLOCK signal. While having input terminals for receiving the standard DRAM control signals (RAS, CAS, CS, WE), SDRAM 13 also includes a decoder that is not shown in FIG. 1. The decoder decodes the CONTROL signals and some of the ADDRESS signals to recognize commands, not associated with conventional memory accesses, which are used to perform various functions associated with accessing SDRAM 13. TABLE 1 shows a list of these commands for a typical implementation of a four megabit (4 Meg) DRAM:

TABLE 1

| Command | Symbol | CKEn-1 | n | CS | RAS | CAS | WE | A9 | A8 | A7–A0 |
|---|---|---|---|---|---|---|---|---|---|---|
| IGNORE | DESL | H | X | H | X | X | X | X | X | X |
| No operation | NOP | H | X | L | H | H | H | X | X | X |
| Full-page burst stop | BST | H | X | L | H | H | L | X | X | X |
| Column address and read | READ | H | X | L | H | L | H | V | L | V |
| Read with auto-precharge | READA | H | X | L | H | L | H | Y | H | V |
| Column address and write | WRIT | H | X | L | H | L | L | V | L | V |
| Write with auto-precharge | WRITA | H | X | L | H | L | L | V | H | V |
| Row address strobe and bank activation | ACTV | H | X | L | L | H | H | V | V | V |
| Precharge selected bank | PRE | H | X | L | L | H | L | V | L | X |
| Precharge both banks | PALL | H | X | L | L | H | L | X | H | X |
| Auto refresh | REF | H | H | L | L | L | H | X | X | X |
| Self refresh | SELF | H | L | L | L | L | H | X | X | X |
| Self refresh exit | SELFX | L | H | L | H | H | H | X | X | X |
|  |  | L | H | H | X | X | X | X | X | X |
| Mode register set | MRS | H | X | L | L | L | L | V | L | V |
| Power down | PWRDN | H | L | L | H | H | H | X | X | X |
|  |  | H | L | H | X | X | X | X | X | X |
| Power down exit | PWRDNX | L | H | L | H | H | H | X | X | X |
|  |  | L | H | H | X | X | X | X | X | X |

In addition, mode register 30 includes several mode bits or fields which allows SDRAM 13 to interface to different types of processors. The operation of mode register 30 is better understood with reference to FIG. 2, which illustrates mode register 30 in block diagram form. In FIG. 2, the symbol "R" represents a reserved encoding, whereas the symbol "F.P." represents a full page mode.

Mode register 30 includes, for a typical implementation of a four megabit (4 Meg) DRAM, ten bits wherein each bit corresponds to a bit of the ADDRESS, organized into five fields 31–35. These fields are programmed by the activation of the MRS command as defined in TABLE 1, during which command bits A9–A0 are stored in mode register 30. Field 31 is labeled "OPCODE" and corresponds to bits A9 and A8 and defines whether burst writes are performed in the write mode. Field 32 corresponds to address signal A7 and is always set to 0. Field 33 is labeled "LMODE" (Latency MODE) and includes three bits which define the CAS latency. Field 34 includes a single bit labeled "BT" which determines the type of burst, either sequential or interleaved. Finally field 35 is labeled "BL" and includes three bits corresponding to address bits A2, A1, and A0. Field 35 defines the burst length.

Returning now to FIG. 1, an explanation of the operation of memory controller 12 will now be given. Memory controller 12 recognizes when processor 11 is attempting to access SDRAM 13 and provides the appropriate timing and control signals thereto. Memory controller 12 recognizes two types of accesses. First after power up, processor 11 performs a write cycle to a memory-mapped location to cause memory controller 12 to initialize SDRAM 13. The memory mapped location is determined by address compare circuit 22 and when it detects an access to that location, address compare circuit 22 provides the INITIALIZATION SEQUENCE output signal to state machine 28. In response, state machine 28 causes SDRAM 13 to recognize two commands. The first command is the PALL (Precharge ALL) command, which is required to precharge all banks after power up where it is assumed that SDRAM 13 has at least two banks (not illustrated). The second command is the MRS (Mode Register Select) command, which programs mode register 30.

Second, after completing the power up sequence memory controller 12 performs ordinary read and write accesses with SDRAM 13. Address compare circuit 20 recognizes attempted read and write accesses to SDRAM 13. Address compare circuit 20 compares a portion of the ADDRESS to corresponding bits of the base address of SDRAM 13. If these addresses coincide, address compare circuit 20 outputs the DRAM HIT signal. State machine 28 then activates the RAS, CAS, CS, and WE control signals as active logic low signals in the proper timing and sequence to complete the read and write accesses.

In system 10, SDRAM 13 is connected to the twelve lower order bits of the address bus and this connection has certain implications for the speed and complexity of memory controller 12. During the first portion of an access, dedicated multiplexors 24 output the row address to SDRAM 13, and state machine 28 activates RAS. These address bits are higher order address bits but are multiplexed by dedicated multiplexors 24 onto the address bus as signals A11–A0. During the second portion of the access, memory controller 12 outputs the column address to SDRAM 13 and activates CAS. These signals are multiplexed onto the address bus and provided as signals A11–A0. The number of address bits used depends on the size and organization of SDRAM 13. For example, if SDRAM 13 is organized as 16M×1, then the row address has twelve bits and the column address has twelve bits and N=24. If SDRAM 13 is organized as 2M×8, then the row address has twelve bits but the column address has only nine bits and N=21.

Memory controller 12 requires additional circuitry to support this mapping. First, memory controller 12 includes a dedicated comparator to decode the memory-mapped location used by mode register 30. Second, since the size of SDRAM 13 may vary, it is not known which bit positions the row address will be mapped onto, and the multiplexor must map the higher order row address bits onto the lower order bits in a complex fashion. Third, state machine 28 must recognize and respond to the INITIALIZATION SEQUENCE signal, increasing its complexity. Fourth, since SDRAM 13 receives the row address at the beginning of the cycle, and the row address is the higher order portion of the address, mapping the row address onto the lower bits of the ADDRESS bus would lengthen the cycle.

Memory controller 12 also creates "holes" in the memory map of system 10. Since mode register 30 is programmed by latching the state of the lower order ADDRESS bits, the number of bits used in mode register 30 determines the size of the hole. Furthermore if SDRAM 13 were not placed on the lower-order address bits but instead connected to higher-order address bits, the "hole" would be correspondingly larger.

Figure 3:
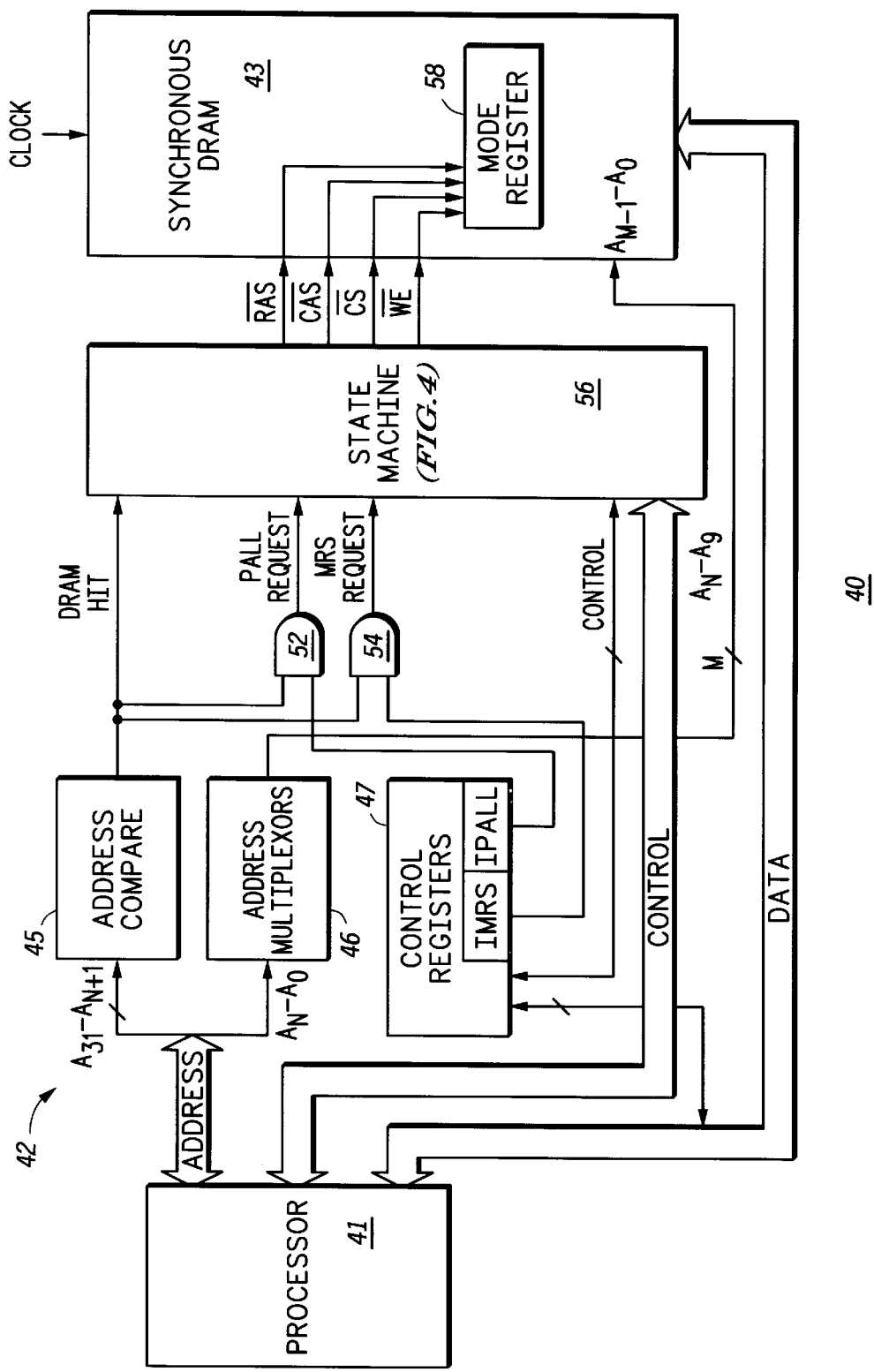
FIG. 3 illustrates in block diagram form a data processing system with a memory controller according to the present invention.

FIG. 3 illustrates in block diagram form a data processing system 40 with a memory controller 42 according to the present invention. Data processing system 40 includes generally a processor 41, a memory controller 42, and a synchronous dynamic random access memory (SDRAM) 43. Processor 41 has a bi-directional control terminal for conducting control signals labeled "CONTROL", an address output terminal labeled "ADDRESS", and a bi-directional data terminal for conducting signals labeled "DATA".

Memory controller 42 includes an address comparator or address compare circuit 45, address multiplexors 46, control registers 47, logic circuitry including a first AND gate 52 and a second AND gate 54, and a control portion or state machine 56. Address compare circuit 45 has an input terminal for receiving a portion of the ADDRESS, and an output terminal for providing a signal labeled "DRAM HIT". In the illustrated embodiment, processor 41 outputs a 32-bit address $A_{31}$–$A_0$, and address compare circuit 45 receives a portion of these address signals labeled "$A_{31}$–$A_{N+1}$". Address compare circuit 45 has an input terminal for receiving address signals A31–$A_{N+1}$, and an output terminal for providing a signal labeled "DRAM HIT". Address multiplexors 46 have an input terminal for receiving address signals $A_N$–$A_0$, a control input terminal, and an output terminal for providing M address signals. SDRAM 13 is mapped not into the lower address bits, but instead onto M upper address bits. Control registers 47 have a bi-directional control terminal, and a bi-directional terminal connected to the DATA bus. Control registers 47 include a first control bit labeled "IPALL" (Initiate Precharge ALL) and a second control bit labeled "IMRS" (Initiate Mode Register Set) which function as a control bit memory which is under control of either processor 41 or external program control. AND gate 52 has a first input terminal for receiving the DRAM HIT signal, a second input terminal for receiving the value of the IPALL bit from control register 47, and an output terminal for providing a signal labeled "PALL REQUEST". AND gate 54 has a first input terminal for receiving the DRAM HIT signal, a second input terminal for receiving the value of the IMRS bit from control registers 47, and an output terminal for providing a signal labeled "MRS REQUEST" (Mode Register Select REQUEST). State machine 56 has a bi-directional control terminal connected to the control terminal of processor 41 for conducting the CONTROL signals, an input terminal for receiving the PALL REQUEST signal, an input terminal for receiving the MRS REQUEST signal, a bi-directional control terminal connected to the control terminal of control register 47, an input terminal for receiving the DRAM HIT signal, and output terminals for providing the RAS, CAS, CS, and WE control signals in active logic low form.

SDRAM 43 has an input terminal for receiving a clock signal labeled "CLOCK" which synchronously clocks SDRAM 43, control input terminals for receiving the RAS, CAS, CS, and WE signals in active logic low form, and a bi-directional data terminal connected to the data terminal of processor 41. SDRAM 13 further includes a mode register 58 having an input terminal for receiving the RAS, CAS, CS, and WE signals in active logic low form, and an input terminal connected to the output terminal of address multiplexors 46.

In operation, processor 41 and SDRAM 43 (including mode register 58) are identical in structure to corresponding elements of FIG. 1. However, SDRAM 43 is mapped into M higher-order address bits labeled "$A_N$ ... $A_9$". Note that the M address bits need not be consecutive. Mapping SDRAM 43 onto address bits which are not the lowest order address bits provides a performance advantage over the data processing system 10 of FIG. 1. Since SDRAM 43 requires the row address to be provided to the address bus first, memory controller 42 is able to provide this address directly to the bus without performing a multiplexing function. The multiplexing function could not otherwise be started until the address compare circuit 45 outputs the DRAM HIT signal, which would extend a current memory cycle. Second, memory controller 42 uses the output of an existing address compare circuit 45 to generate the PALL REQUEST and MRS REQUEST signals, eliminating the need for an extra comparator to detect an access to a memory-mapped initialization address. Third, memory controller 42 avoids the need for additional complexity in the multiplexors' section. Fourth, by generating the PALL and MRS commands using available signals, memory controller 42 reduces the amount of circuitry required for state machine 56. While the user will have to execute two instructions during the initialization sequence instead of one, these commands are only required after reset and the circuitry required for state machine 56 is greatly reduced. Fifth, since mode register 58 is no longer memory-mapped, memory controller 42 does not insert any additional "holes" into the memory map. In other words, the address compare circuitry, address compare circuit 45, shares a portion of the same predefined mapped section of SDRAM 43 which is used to both provide data to processor 41 and to generate encoded command signals for controlling operation of the memory not associated with conventional memory accesses, thereby avoiding separate and additional memory mapping to support the address compare circuit 45.

Figure 4:
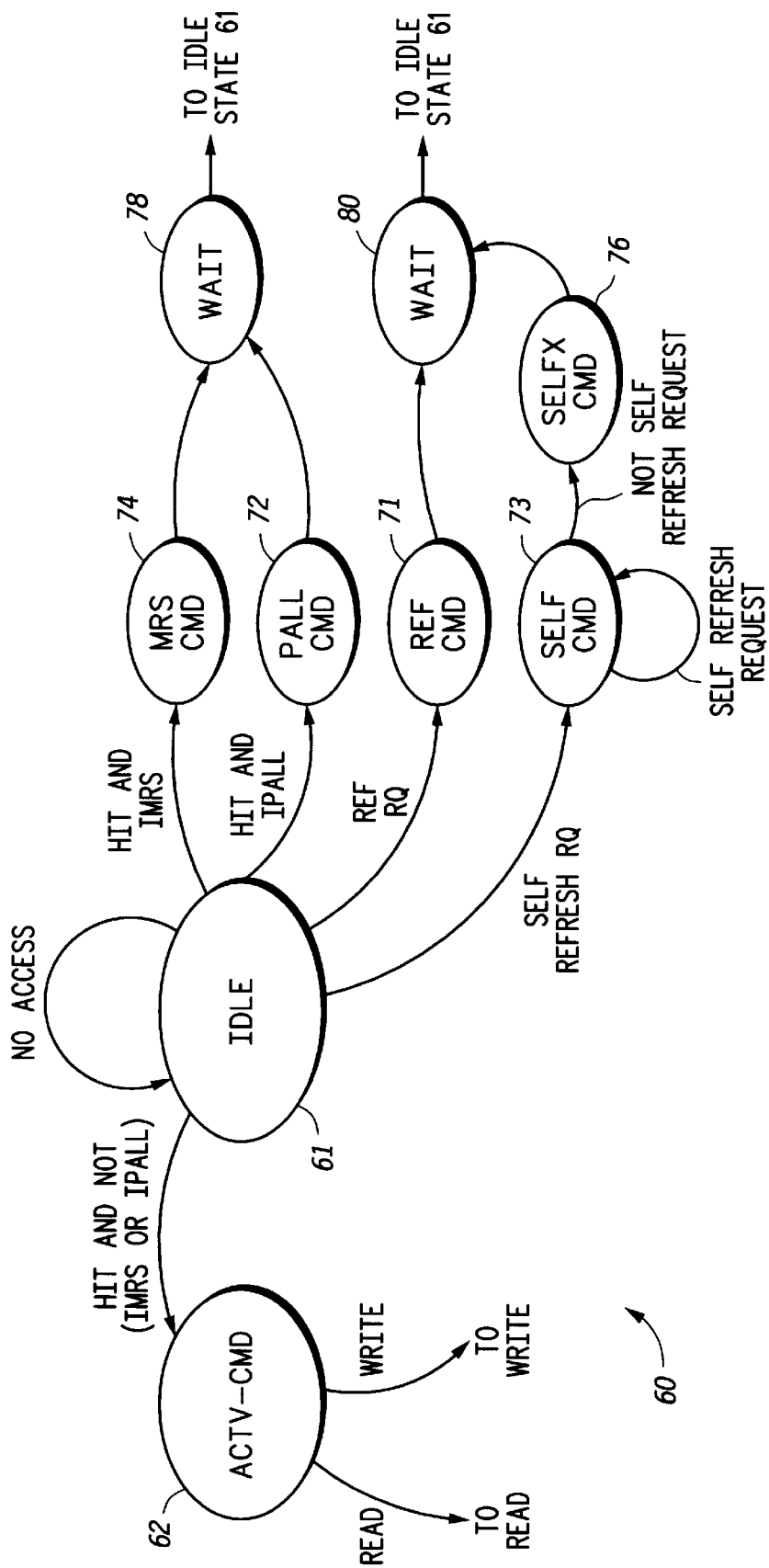
FIG. 4 illustrates in state diagram form a portion of a state diagram implemented by the state machine of FIG. 3.

The portion of state machine 56 which supports the PALL and MRS commands is better understood with reference to FIG. 4 which illustrates in state diagram form a portion of a state diagram 60 implemented by state machine 56 of FIG. 3. State machine 56 begins in a state 61 labeled "IDLE", and remains in that state as long as there is no access. In response to an active access, which state machine 56 recognizes when signal DRAM HIT is active and signals IMRS and IPALL are both inactive, state machine 56 enters a state 62 labeled "ACTV_CMD". State machine 56 then leaves state 62 to perform a read if a read indication from processor 11 is active, or a write if a write indication from processor 11 is active.

State machine 56 may also leave IDLE state 61 on the occurrence of four other commands: a refresh command labeled "REF_CMD", a PALL (Precharge ALL) command labeled "PALL_CMD", a self-refresh command labeled "SELF_CMD", and an MRS (Mode Register Select) command labeled "MRS_CMD". These commands cause state machine 56 to enter a corresponding one of four states 71–74. After completion of the respective command, state machine 56 enters a sequence of wait states which varies depending on the value of a field in control register 47 designated "CAS LATENCY" (Column Address Signal LATENCY) which corresponds to the CAS LATENCY field in mode register 58. The wait states for the PALL and MRS command are illustrated by a wait state 78. Note that the SELF command requires the reception of a SELFX request at state 76 before entering its sequence of wait states, which it shares with the REF command in wait state 80. After completion of the required number of wait states in states 78 or 80, as the case may be, state machine 56 returns to idle state 61. FIG. 4 illustrates that state machine 56 may implement the MRS and PALL commands using portions of existing flows, minimizing the circuitry required to implement these commands.

Although the present invention has been described with reference to a specific embodiment, further modifications and improvements will occur to those skilled in the art. For example, the types of modes may vary from embodiment to embodiment. Furthermore, a memory controller according to the present invention is not limited to a synchronous DRAM controller but may be used for other types of memories which require non-memory access commands, such as electrically erasable programmable read only memory (EEPROM) and the like. EEPROMs typically require commands to enable the high-voltage charge pump before performing a program (write) access. Therefore it is to be understood that the invention encompasses all such modifications that do not depart from the scope of the invention as defined in the appended claims.

What is claimed is:

1. A memory controller for generating commands to a memory which uses encoded command signals not associated with conventional memory accesses, the memory controller comprising:

a control portion for controlling operation of the memory controller, the control portion providing only memory control signals normally associated with the conventional memory accesses, the encoded command signals being encoded by encoding combinations of the memory control signals normally associated with the conventional memory accesses to form the encoded command signals;

an address comparator for receiving an address and for determining whether the address is assigned to the memory, the address comparator providing an output signal which both indicates a match between the address and one of a plurality of predetermined assigned addresses for the memory and which is also used as a first control signal for generation of one of the encoded command signals;

a control register for storing and providing memory configuration information for the memory controller, the control register also storing a command bit which is used as a second control signal for generation of the one of the encoded command signals; and logic circuitry coupled to the control register, to the address comparator and to the control portion, the logic circuitry using the first and second control signals to provide a request signal to the control portion, the control portion providing one of the encoded command signals in response thereto.

2. The memory controller of claim 1 wherein the commands used by the memory comprise a precharge command which functions to control precharging of one or more memory banks in the memory, and a mode register set command which functions to initialize a mode register in the memory for controlling types of operation in the memory, the precharge and mode register set commands being generated in response to information contained in the address received by the address comparator.

3. The memory controller of claim 1 wherein the logic circuitry further comprises:

a first logic gate having a first input connected to the first control signal, a second input connected to the second control signal, and an output for providing the request signal in response to the first and second control signals.

4. The memory controller of claim 3 wherein the control register further stores a second command bit which is used as a third control signal, and the logic circuitry provides a second request signal to the control portion, the logic circuitry further comprising:

a second logic gate having a first input connected to the first control signal, a second input connected to the third control signal, and an output for providing the second request signal in response to the first and second control signals.

5. The memory controller of claim 1 wherein the memory controller is further coupled to a processor, and the control portion of the memory controller further comprises a state machine which interprets requests from the processor, the state machine having a predetermined plurality of defined states which define when the encoded command signals are provided to the memory and what encodings are given.

6. In a memory system having a memory controller, a method for generating commands to a memory which uses encoded command signals not associated with conventional memory accesses, the method comprising the steps of:

providing a control circuit for controlling operation of the memory controller, the control circuit providing only memory control signals normally associated with the conventional memory accesses, the encoded command signals being encoded by encoding combinations of the memory control signals normally associated with the conventional memory accesses to form the encoded command signals;

receiving an address and determining whether the address is assigned to the memory by comparing the address and one of a plurality of predetermined assigned addresses for the memory;

providing an address match signal in response to determining that the address is assigned to the memory;

using the address match signal as a first control signal for generation of one of the encoded command signals;

storing and providing memory configuration information for the memory controller in a control register, the control register also storing a command bit which is used as a second control signal for the generation of one of the encoded command signals; and providing logic circuitry which receives the first and second control signals and provides a first request signal to the control circuit, the control circuit providing one of the encoded command signals in response thereto.

7. The method of claim 6 comprising the step of storing a second command bit which is used as a third control signal for generation of another of the encoded command signals.

8. The method of claim 7 wherein the step of providing logic circuitry further comprises the steps of:

providing a first logic gate, the first logic gate having a first input for receiving the first control signal, a second input for receiving the second control signal, and an output for providing the first request signal to the control circuit in response to the first and second control signals; and providing a second logic gate, the second logic gate having a first input for receiving the first control signal, a second input for receiving the third control signal, and an output for providing a second request signal to the control circuit in response to the first and third control signals.

9. The method of claim 6 further comprising the step of:

synchronously clocking the memory with a clock signal as a synchronous dynamic random access memory.

10. The method of claim 6 wherein the control circuit comprises a state machine which interprets external requests, the state machine having a predetermined plurality of defined states which define when the encoded command signals are provided to the memory and what encodings are given.

11. A data processing system comprising:
a processor for communicating data, addresses and control information;
a memory coupled to the processor, the memory storing and providing data to the processor from a predetermined mapped section of the memory; and
a memory controller coupled to the processor and the memory, the memory controller providing only memory control signals normally associated with conventional memory accesses to the memory and providing an encoding of the control signals to generate encoded command signals used to control operation of the memory not associated with the conventional memory accesses, the encoded command signals being encoded by encoding combinations of the memory control signals normally associated with the conventional memory accesses to form the encoded command signals, the memory controller having address compare circuitry for comparing received addresses with addresses of the memory and providing an output match signal for use both as an address match indication and for use to generate the encoded command signals, the address compare circuitry sharing a portion of the predetermined mapped section of the memory to provide data to the processor and to generate the encoded command signals used to control the operation of the memory not associated with the conventional memory accesses, thereby avoiding separate and additional memory mapping to support the address compare circuitry.

12. The data processing system of claim 11 wherein the memory controller further comprises a control bit memory means which is under control by either the processor or external program control, the control bit memory means being coupled to logic circuitry which also receives an output of the address compare circuitry to generate the encoded command signals.

13. The data processing system of claim 12 wherein the memory controller further comprises a state machine coupled to the logic circuitry, the state machine providing the encoded command signals used to control operation of the memory not associated with the conventional memory accesses in response to receiving an output from the logic circuitry.

14. The data processing system of claim 12 wherein the control bit memory means of the memory controller further comprises a plurality of control bits, each control bit being separately logically combined with the output match signal to generate a request signal for activating a predetermined encoded command signal.

15. The data processing system of claim 11 wherein the memory is a synchronous dynamic random access memory which is synchronously clocked by a clock signal.

* * * * *